(12) United States Patent
Natarajan (10) Patent No.: US 11,497,029 B2
(45) Date of Patent: Nov. 8, 2022

(54) INTERFERENCE AWARE UPLINK CELL SELECTION

(71) Applicant: T-Mobile USA, Inc., Bellevue, WA (US)

(72) Inventor: Balamurali Natarajan, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 51 days.

(21) Appl. No.: 16/951,972

(22) Filed: Nov. 18, 2020

(65) Prior Publication Data
US 2022/0159660 A1    May 19, 2022

(51) Int. Cl.
*H04W 72/08* (2009.01)
*H04W 72/04* (2009.01)

(52) U.S. Cl.
CPC ..... *H04W 72/082* (2013.01); *H04W 72/0413* (2013.01); *H04W 72/0453* (2013.01)

(58) Field of Classification Search
CPC ........... H04W 72/082; H04W 72/0453; H04W 72/0413
See application file for complete search history.

(56) References Cited

U.S. PATENT DOCUMENTS

| 2006/0160541 A1* | 7/2006 | Ryu | H04W 36/30 455/446 |
| 2012/0134284 A1* | 5/2012 | Dahlman | H04W 48/18 370/255 |
| 2019/0069205 A1* | 2/2019 | Lee | H04W 48/20 |

* cited by examiner

*Primary Examiner* — Brenda H Pham (57) ABSTRACT

Solutions for interference aware uplink cell selection for a user equipment (UE) include: determining a path loss (PL) between the UE and a considered cell; determining a PL between the UE and a neighbor cell; based on at least the PL between the UE and the considered cell and the PL between the UE and the neighbor cell, determining a cell with an uplink frequency band having a minimum relative PL for the UE; and assigning, to the UE, the cell with the uplink frequency band having the minimum relative PL. In some examples, the network includes both 5G and 4G cells. Some examples include determining whether the PL for the cell having the minimum relative PL for the UE meets a PL threshold and if so, assigning, to the UE, the cell with the uplink frequency band having the minimum absolute PL for the UE.

20 Claims, 8 Drawing Sheets

INTERFERENCE AWARE UPLINK CELL SELECTION

BACKGROUND

In some cellular networks, different frequency bands may be deployed with overlapping coverage areas. Thus, in some scenarios, mobile devices (user equipment, UEs) are able to communicate with multiple cells (e.g., multiple base station towers or even multiple frequency bands on a single tower). Uplink channels are assigned to UEs based upon which cell provides the minimum absolute path loss (PL), for example the cell with the highest signal strength, or possibly based on cell loading. Path loss, or path attenuation, is the reduction in power density (attenuation) of an electromagnetic wave as it propagates through space. The channel with the minimum absolute PL is the channel providing the highest received power (highest channel gain, which is the inverse of PL) at the cell base station. (Note that the 3GPP standard references PL when describing cell selection).

Unfortunately, in a complex arrangement in which a UE is able to communicate with multiple cells, the selection of the cell with the minimum absolute PL does not account for inter-cell interference and may thus increase interference for other nearby UEs. This may then reduce the signal-to-noise ratio (SNR) for the UEs in that area and adversely affect the throughput of cellular network data traffic.

SUMMARY

The following summary is provided to illustrate examples disclosed herein, but is not meant to limit all examples to any particular configuration or sequence of operations.

Solutions for interference aware uplink cell selection for a user equipment (UE) on a network include: determining a path loss (PL) between the UE and a considered cell; determining a PL between the UE and a first neighbor cell; based on at least the PL between the UE and the considered cell and the PL between the UE and the first neighbor cell, determining an uplink frequency band having a minimum relative PL for the UE; and assigning, to the UE, the cell with the uplink frequency band having the minimum relative PL for the UE. In some examples, the network has multiple frequency bands and includes both 5G and 4G cellular network cells. Some examples further include determining whether the PL for the cell having the minimum relative PL for the UE meets a PL threshold and, based on at least the PL for the cell having the minimum relative PL for the UE meeting the PL threshold, assigning, to the UE, the cell with the uplink frequency band having the minimum absolute PL for the UE.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for interference aware uplink cell selection for a user equipment (UE) on a network include: determining a path loss (PL) between the UE and a considered cell; determining a PL between the UE and a first neighbor cell; based on at least the PL between the UE and the considered cell and the PL between the UE and the first neighbor cell, determining a cell with an uplink frequency band having a minimum relative PL for the UE; and assigning, to the UE, the cell with the uplink frequency band having the minimum relative PL for the UE. In some examples, the network has multiple frequency bands and includes both 5G and 4G cellular network cells. Some examples further include determining whether the PL for the cell having the minimum relative PL for the UE meets a PL threshold and, based on at least the PL for the cell having the minimum relative PL for the UE meeting the PL threshold, assigning, to the UE, the cell with the uplink frequency band having the minimum absolute PL for the UE.

Aspects of the disclosure improve the throughput of cellular network data traffic by assigning, to the UE, the uplink serving cell and the frequency band having the minimum relative PL for the UE, rather than assigning the uplink serving cell and the frequency band having the minimum absolute PL (except, in some examples, when the PL between the UE and the cell that has the minimum relative PL for the UE meets a PL threshold that indicates the PL is too high to use the minimum relative PL). PL, or path attenuation, is the reduction in power density (attenuation) of an electromagnetic wave as it propagates through space and is the inverse of channel gain. Aspects of the disclosure consider the inter-cell interference cause by a UE to neighboring cells and select the uplink serving cell as the cell that maximizes the relative uplink channel gain. Relative uplink channel gain may be determined as the ratio of the user channel gain to considered cell over the sum or average of user channel gains to neighboring co-channel cells. Channel gain is often expressed as a scalar value, while PL is often expressed in decibels (dB), using a logarithmic expression. Thus, the minimum relative PL may be determined as the PL of the considered cell minus the sum of the PLs of all the other neighboring cells. Note that when using the dB representation of PL, subtraction is equivalent to a division, such as may be used in computing a ratio.

This interference aware solution advantageously improves uplink signal-to-noise ratio (SNR) because it associates more UEs to UL serving cells and frequency bands that experience less uplink interference. In general, dense, high-interference arrangements may experience greater improvements. Additional benefits include improving load balancing of users across the different frequency bands, which then provides more resource blocks (RBs) for user scheduling. RBs are a unit of data-carrying capacity, so aspects of the disclosure improve UL user throughput, thereby improving the throughput of cellular network data traffic. Thus, by changing the cell selection criteria for uplink channels, from the minimum absolute PL to the minimum relative PL, network data capacity increases. Aspects of the disclosure may be relevant to networks having both fifth generation (5G) and fourth generation (4G) cellular network cells, as well as networks having overlapping 5G cellular network cells with multiple frequency bands.

Figure 1:
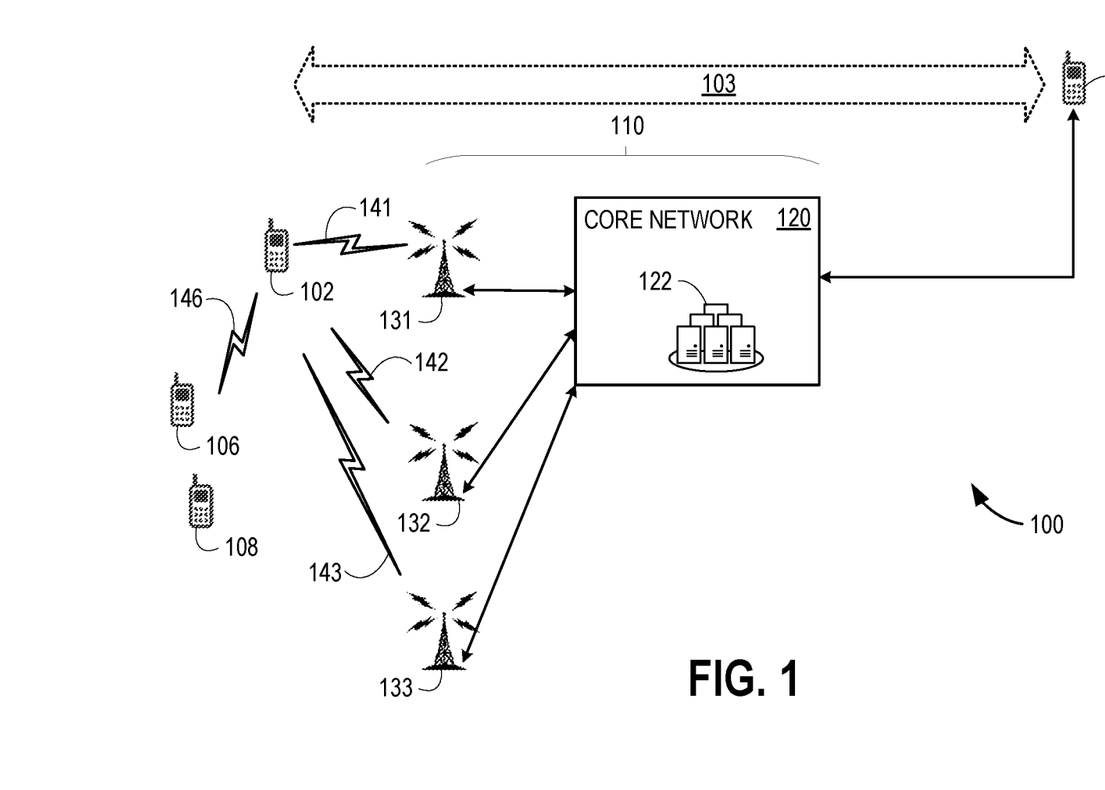
FIG. 1 illustrates an exemplary arrangement that advantageously employs interference aware uplink cell selection.

With reference now to the figures, FIG. 1 illustrates an exemplary arrangement 100 that advantageously employs interference aware uplink cell selection. Arrangement 100 selects an uplink cell for UE 102 on network 110, so that UE 102 may have a data session 103 (e.g., a voice call, a video call, or a general data packet exchange, such as uploading or downloading files) with another UE 104 or a node on a packet data network. Network 110 includes a core network 120 that has a control agent 122, and a plurality of base station towers representing cells 131, 132, and 133. Network 110 may be distributed, for example, with various nodes at differing geographical locations. Core network 120 and control agent 122 may each likewise have various nodes distributed among differing geographical locations. Network 110, core network 120, and control agent 122 may each include 5G components and, in some examples, may also each include 4G components. In some examples, UE 102 may be an E-UTRAN New Radio—Dual Connectivity (EN-DC) device, which is able to simultaneously receive and/or transmit on both the 5G base station and 4G base stations cell frequencies.

UE 102 is able to communicate with cell 131 using an air interface 141, communicate with cell 132 using an air interface 142, and communicate with cell 133 using an air interface 143. In some examples, base station towers may each support multiple cells, as illustrated in further detail in FIGS. 2A-2F, for example by using frequency diversity (e.g., different frequency bands). In some examples, cells 131-133 may include a mixture of 5G and 4G cells. 5G and 4G typically operate at different frequency bands, and 5G uses different types of cells that each use different frequencies from a single base station tower. Thus, network 110 may have multiple frequency bands.

As illustrated in FIG. 1, UE 102 is not the only UE in the same approximate geographical area. Other UEs, UE 106 and UE 108, are also nearby. This means that interference 146 may exist among UEs 102, 106, and 108, with each causing interference for the others and receiving interference from the others. Control agent 122 (a component of network 110) thus performs interference aware uplink cell selection for UE 102 on network 110, by performing calculations and determinations described herein for network 110. In some examples, control agent 122 is able to determine PLs between UE 102 and each of cells 131-133 (noting that a single base station tower may support multiple cells at different frequency bands). For example, using techniques known in the art, control agent 122 is able to determine not only the PL between UE 102 and a considered cell (e.g., cell 131), but also the PLs between UE 102 and the neighboring cells (e.g., cells 132 and 133, and even a cell using a different frequency band using the same base station tower as cell 131).

For example, each of the cells, and each of the frequency bands (if a base station tower supports more than a single frequency band) that are within range of UE 102 may be tested, in turn, as a "considered cell" until the particular "considered cell" is identified that provides the minimum relative PL. When a base station or base station tower supports more than a single frequency band, the different frequency bands are different cells, as used herein. In some examples, different frequency bands may be used with different frequency reuse patterns. In some examples, different base station towers support different frequency bands, such that some frequency bands used by one base station are not available at a nearby base station. For example, the set of 5G base stations may have different frequency reuse (e.g., some base stations support frequency bands not supported by other nearby base stations, and some base stations do support frequency bands supported by other nearby base stations), and similarly, the set of 4G base stations may also have different frequency reuse.

A neighbor cell is a cell (excluding the considered cell) supported by a base station that is both nearby and uses the same frequency band (or an overlapping frequency band), rather than a nearby base station that uses a different, non-overlapping frequency band. Thus, for any particular considered cell, the set of neighbor cells considered in the relative PL calculations depends on which nearby cells use the same frequency band. Changing to a considered cell at a different frequency band (even is using the same base station tower) is likely to change the set of neighbor cells (based on frequency reuse patterns). Some examples determine a relative PL using only a single considered neighbor cell, for example the neighbor cell providing the highest signal power level (other than the considered cell). Some examples, determine a relative PL using a plurality of neighbor cells, for example those cells that are sufficiently close to provide a signal power level above some threshold.

A process of determining an uplink serving cell and frequency band having a minimum relative PL for UE 102, based on at least the PL between UE 102 and a considered cell and the PL between UE 102 and a plurality of neighbor cells is provided below. In some examples, network 110 performs the determination using control agent 122. A user metric $u_i$ is given by Equation 1 for user i (UE 102) as:

$$u_i = w_i \left( \log(s_i) - \frac{s_i - 1}{s_i} \right) \qquad \text{Eq. (1)}$$

where $w_i$ is the user scheduling weight and $s_i$ is the user target uplink interference penalty algorithm SNR. The user target uplink interference penalty algorithm SNR $s_i$ may be found using:

$$s_i = \frac{P_0 w_i}{I + N_0} \left( \frac{g_i}{g'_i} \right) \qquad \text{Eq. (2)}$$

where $P_0$ is a power control parameter, $I+N_0$ is the interference (e.g., interference 146) plus noise, $g_i$ is the channel gain for user i, and $g'_i$ is the sum of channel gains for neighboring cells for user i.

User metric $u_i$ is non-decreasing in $s_i$, provided that $s_i \geq 1$, as shown by:

$$\frac{\partial u}{\partial s} = \left( \frac{1}{s} - \frac{1}{s^2} \right) \geq 0 \bigg| s \geq 1 \qquad \text{Eq. (3)}$$

The condition $s_i \geq 1$ on the minimum target uplink SNR may be ensured by using it as a scheduler criterion. The uplink cell (5G or 4G) that maximizes the target uplink interference penalty algorithm SNR $s_i$ will be selected as the uplink serving cell for UE 102. The uplink serving cell for user i, selected by the interference aware process, is $Ci_{,IA}$ and is given by:

$$C_{i,IA} = \mathrm{argmax}_{C \in C_{4G} \cup C_{5G}} (s_{i,C}) \quad \text{Eq. (4)}$$

where $s_{i,c}$ is given by Equation 2 for the selected uplink serving cell C. Substituting Equation 2 for $s_{i,c}$ in Equation 4 gives:

$$C_{i,IA} = \mathrm{argmax}_{C \in C_{4G} \cup C_{5G}} \left[ \frac{P_0 w_i}{(1+N_0)_C} \left( \frac{g_{i,C}}{g'_{i,C}} \right) \right] \quad \text{Eq. (5)}$$

Equation 5 simplifies to:

$$C_{i,IA} \approx \mathrm{arg\_max}_{C \in C_{4G} \cup C_{5G}} \left( \frac{g_{i,C}}{g'_{i,C}} \right) \quad \text{Eq. (6)}$$

and provides the cell selection criteria in terms of maximizing the relative channel gain ratio.

However, if the PL (the inverse of the gain g) for the selected cell is too high, UE power limitations may render the cell selected by Equation 6 less preferential. Introducing a gain threshold T provides hybrid cell selection criteria:

$$C_{i,Select} = \begin{matrix} C_{i,IA} \\ \mathrm{arg\_max}_{C \in C_{4G} \cup C_{5G}} (g_{i,C}) \end{matrix} \quad \begin{matrix} g_{i,C_{i,IA}} \geq T \\ \text{otherwise} \end{matrix} \quad \text{Eq. (7)}$$

When the channel gain is sufficiently high, such as above the gain threshold T, the interference aware selection (as shown in Equation 6) is used for the selected cell $Ci_{,Select}$ for user i (UE 102). However when this cell provides insufficient channel gain, such as below the gain threshold T, the cell providing the minimum absolute PL (maximum channel $g_{i,c}$) is the selected cell $Ci_{,Select}$ for user i (UE 102).

In Equations 1-7 above, the gain g is expressed as a scalar. PL is the inverse of gain, and is often expressed in dB. Thus, the threshold test using a PL threshold would be that when the PL for the cell having the minimum relative PL for the UE is below the PL threshold, the interference aware selection may be used, whereas when the PL for the cell having the minimum relative PL for UE 102 meets the PL threshold, the cell (e.g. the cell with the uplink frequency band) having the minimum absolute PL for UE may be used. Additionally, when PL is expressed in dB, division of a scalar becomes subtraction. Thus, the maximizing of the relative channel gain ratio in Equation 6 (solving for $Ci_{,IA}$) has an equivalent: determining the minimum relative PL using Equation 8.

$$PL_{minimum\_relative} = \min \left( PL_{considered\ serving\ cell} - \frac{1}{N} \sum PL_{neighbor} \right) \quad \text{Eq. (8)}$$

where N is the number of considered neighbor cells. Dividing the sum of considered neighbor cell PLs by the number of considered neighbor cell provides the average of the considered neighbor cell PLs.

FIGS. 2A, 2B, 2C, 2D, 2E, and 2F illustrate various scenarios of UE 102 within network 110 of FIG. 1, in which network 110 has multiple frequency bands, and various ones of the multiple frequency bands assigned to UE 102 (by network 110, after network 110 makes its selection) as the cell with the uplink frequency band. In some examples, 4G uses frequencies in a frequency band nearby 600 megahertz (MHz), 800 MHz, or 1900 MHz. In some examples, 5G uses frequencies in a frequency band nearby 2.5 gigahertz (GHz) or 3.5 GHz. In some propagation scenarios, 4G provides higher channel gain, due to its lower frequencies.

Figure 2A:
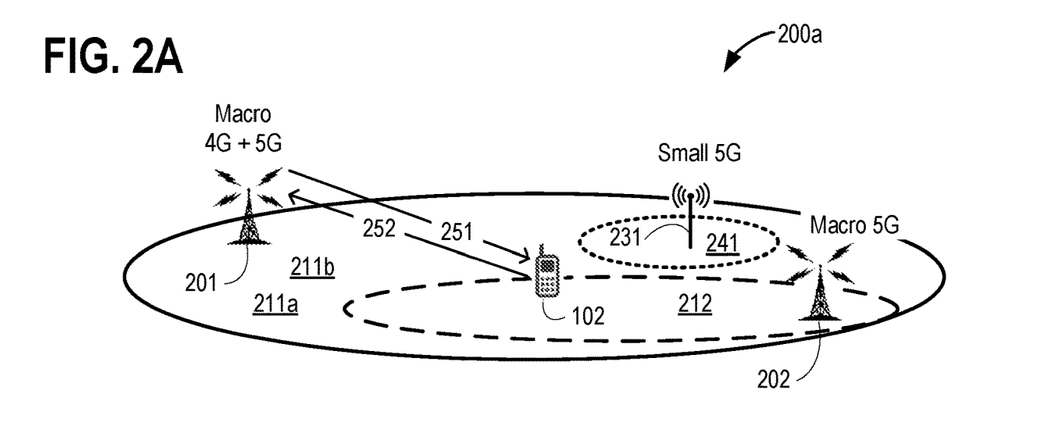
FIGS. 2A, 2B, 2C, 2D, 2E, and 2F illustrates various scenarios of a UE within the network of FIG. 1, in which the network has multiple frequency bands.

Four scenarios are depicted among FIGS. 2A-2F. FIG. 2A illustrates a co-located non-stand-alone (NSA) scenario. A base station tower 201 supports both a macro 4G cell 211a and a macro 5G cell 211b (two frequency bands from the same tower), which are illustrated as having the same oval shape, although sector divisions, power differences, and propagation differences may render cells 211a and 211b different sizes and/or shapes in actual practice. A base station tower 202 supports a macro 5G cell 212, and a small cell 5G base station 231 supports a cell 241. In the scenario depicted in FIG. 2A, 4G cells may be sparsely deployed in a ratio of two or three 5G cells per 4G cell. Four cells 211a, 211b, 212, and 241 are thus illustrated in FIG. 2A, with two frequency bands. Cells 211b, 212, and 241 use a 5G frequency band, whereas cell 211a uses a 4G frequency band (from the same base station tower 201 as 5G cell 211b). UE 102 is able to use a downlink 251 from base station tower 201, which may be a combined downlink using both cells 211a and 211b.

In some examples, UE 102 has the capacity to use multiple uplink channels to different cells, for example transmitting data to both a 4G cell and a 5G cell. This may be referred to as carrier aggregation between 4G and 5G, and is used to provide additional bandwidth for UE 102, over what may be available using only one channel. However, there is a penalty in power usage by UE 102, and power per channel may be limited. Thus, in the scenario depicted in FIG. 2A, UE 102 uses an uplink 252 to a selected one of 4G cell 211a or 5G cell 211b, based upon which provides the minimum relative PL.

Figure 2B:
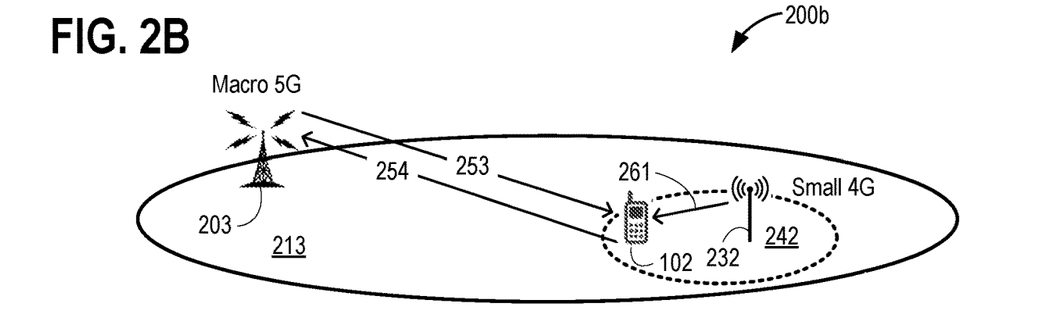
Figure 2C:
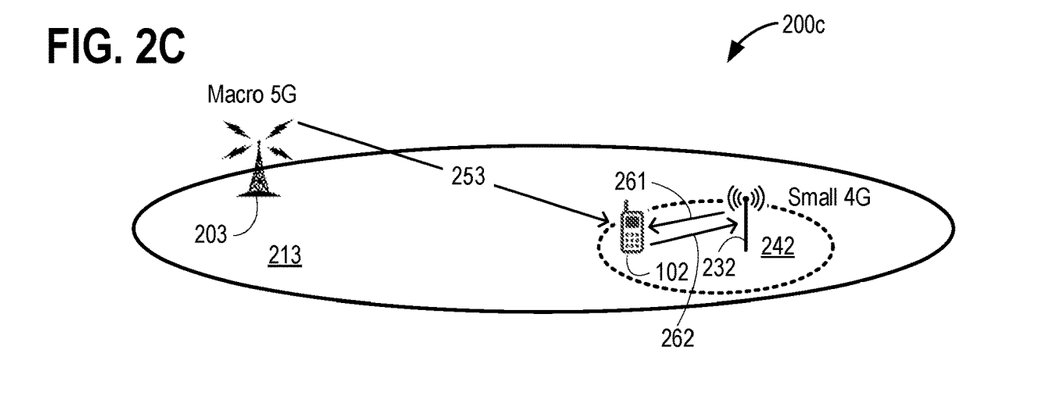

FIGS. 2B and 2C illustrate a non-collocated NSA scenario with two frequency bands. A base station tower 203 supports a macro 5G cell 213, and a small cell 4G base station 232 supports a cell 242. In the scenario depicted in FIGS. 2B and 2C, 4G cells may be densely deployed in a ratio of two or three 4G cells per 5G cell. In FIG. 2B, UE 102 uses a downlink 253 from base station tower 203 (cell 213) and another downlink 261 from base station 232 (cell 242). UE 102 uses an uplink 254 to base station tower 203 (cell 213), selected based on cell 213 providing the minimum relative PL. FIG. 2C is similar in that UE 102 uses downlinks 253 and 261, but now uses an uplink 262 to base station 232 (cell 242), selected based on cell 242 providing the minimum relative PL.

Figure 2D:
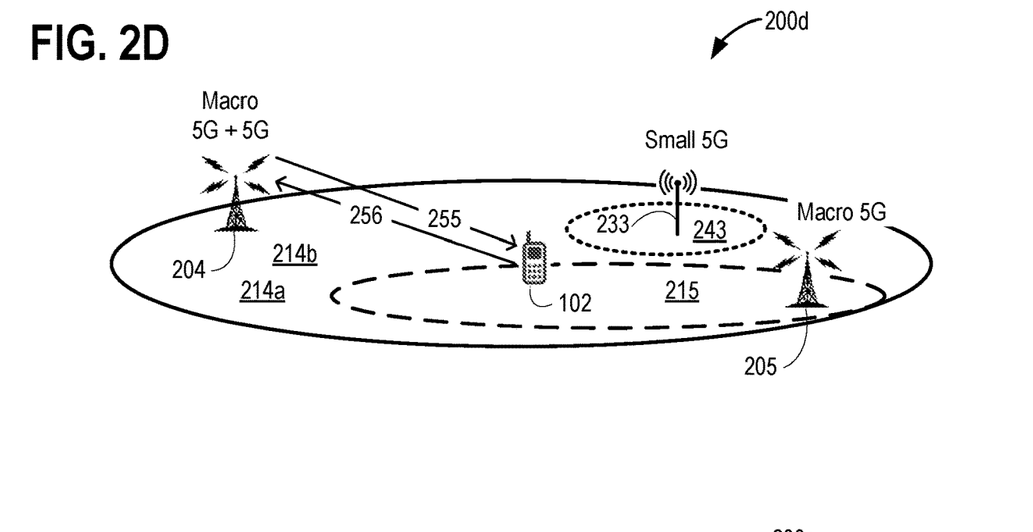

FIG. 2D illustrates a co-located stand-alone (SA) scenario with four frequency bands. A base station tower 204 supports two macro 5G cells, cell 214a and cell 214b (two frequency bands from the same tower), which are illustrated as having the same oval shape, although sector divisions, power differences, and propagation differences may render cells 214a and 214b different sizes and/or shapes in actual practice. A base station tower 205 supports a macro 5G cell 215, and a small cell 5G base station 233 supports a cell 243. UE 102 is able to use a downlink 255 from base station tower 204, which may be a combined downlink using both cells 214a and 214b. UE 102 uses an uplink 256 (to base station tower 204) to a selected one of cell 214a or cell 214b, based upon which provides the minimum relative PL.

Figure 2E:
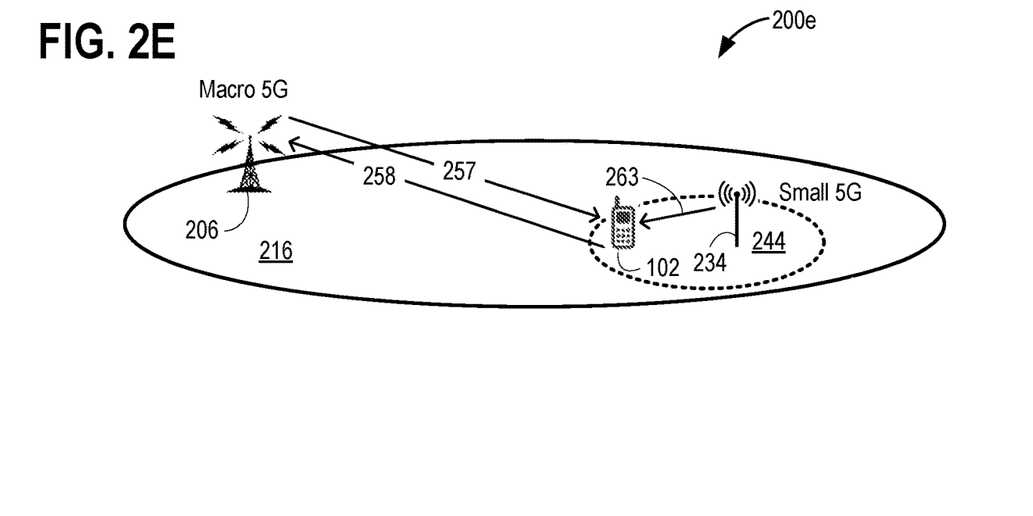
Figure 2F:
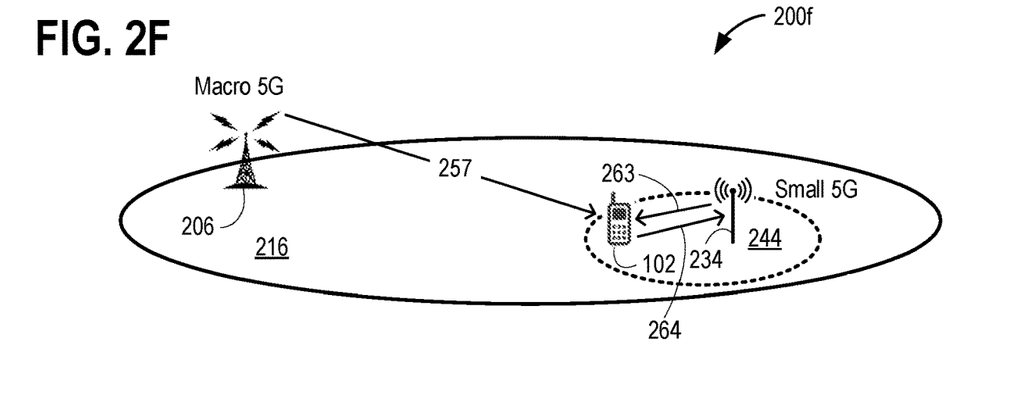

FIGS. 2E and 2F illustrate a non-collocated SA scenario with two frequency bands. A base station tower 206 supports a macro 5G cell 216, and a small cell 5G base station 234 supports a cell 244. In FIG. 2E, UE 102 uses a downlink 257 from base station tower 206 (cell 216) and another downlink 263 from base station 234 (cell 244). UE 102 uses an uplink 258 to base station tower 206 (cell 216), selected based on cell 216 providing the minimum relative PL. FIG. 2F is similar in that UE 102 uses downlinks 257 and 263, but now uses an uplink 264 to base station 234 (cell 244), selected based on cell 244 providing the minimum relative PL.

Figure 3:
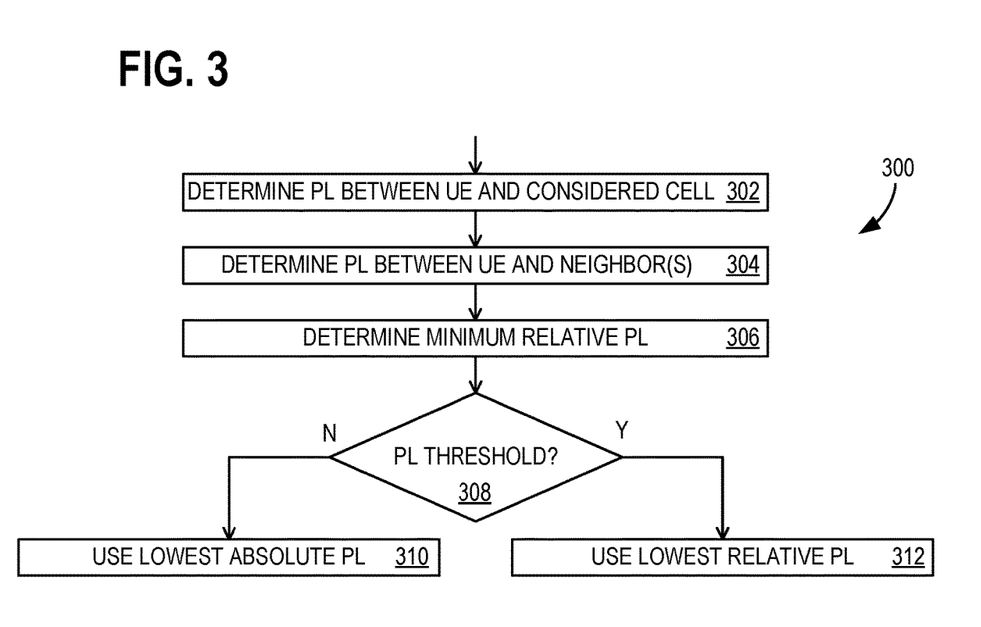
FIG. 3 illustrates a flowchart of exemplary operations associated with the arrangement of FIG. 1.

FIG. 3 illustrates a flowchart 300 of exemplary operations associated with interference aware uplink cell selection for UE 102 on network 110, for example for providing the cell selections depicted in FIGS. 2A-2F, according to Equations 1-8. In some examples, at least a portion of flowchart 300 may be performed using one or more computing devices 700 of FIG. 7. In some examples, network 110 comprises both 5G and 4G cellular network cells. In some examples, the relevant portion of network 110, reachable by UE 102 (e.g., with propagation distance of a transmitter and/or receiver within UE 102), comprises only overlapping 5G cellular network cells. Such scenarios are depicted in FIGS. 2D-2F (as SA scenarios). In some examples, network 110 comprises overlapping 5G cellular network cells with multiple frequency bands, as depicted for base station tower 204 in FIG. 2D.

Operation 302 includes determining a PL between UE 102 and a considered cell (e.g., cell 131). In some examples, determining the PL between UE 102 and the considered cell comprises receiving, by network 110, the PL between UE 102 and the considered cell. For example, determining the PL between UE 102 and the considered cell comprises receiving, by network 110, from the considered cell, the PL between UE 102 and the considered cell. Operation 304 includes determining a PL between UE 102 and a first neighbor cell (e.g., cell 132). In some examples, determining the PL between UE 102 and the first neighbor cell comprises determining, by network 110, the PL between UE 102 and the first neighbor cell. In some examples, determining the PL between UE 102 and the first neighbor cell comprises receiving, by network 110, from the first neighbor cell, an indication of the PL between UE 102 and the first neighbor cell. In some examples, determining the PL between UE 102 and the first neighbor cell comprises receiving, by network 110, from UE 102, an indication of the PL between UE 102 and the first neighbor cell. In some examples, operation 302 includes determining an average PL between UE 102 and each of a plurality of neighbor cells (e.g., cells 132 and 133), the plurality of neighbor cells comprising the first neighbor cell. In some examples, the PLs for the additional neighboring cells may be determined similarly as for the first neighboring cell.

Operation 306 includes, based on at least the PL between UE 102 and the considered cell and the PL between UE 102 and the first neighbor cell, determining a cell with an uplink frequency band having a minimum relative PL for UE 102. In some examples, determining the cell with the uplink frequency band having the minimum relative PL for UE 102 comprises determining, by network 110, the cell with the uplink frequency band having the minimum relative PL for UE 102 (e.g., using control agent 122, which is a portion of network 110). In some examples, determining the cell with the uplink frequency band having the minimum relative PL for UE 102 comprises, based on at least the PL between UE 102 and the considered cell and the PLs between UE 102 and each of the plurality of neighbor cells, determining the cell with the uplink frequency band having the minimum relative PL for UE 102. That is, operation 306 may be performed for a considered cell and a single neighbor cell, or for a considered cell and a plurality of neighbor cells.

Decision operation 308 includes determining whether the PL for the cell having the minimum relative PL for UE 102 meets a PL threshold. If so (e.g., the channel gain is not sufficiently high to use the maximum relative channel gain), operation 310 includes, based on at least the PL for the cell having the minimum relative PL for UE 102 meeting the PL threshold, assigning, to UE 102, the cell with the uplink frequency band having the minimum absolute PL for UE 102. In some examples, network 110 selects the uplink channel and assigns it to UE 102. This avoids power limitation issues in which UE 102 is not able to provide a sufficient SNR for the cell having the minimum relative PL.

Otherwise, operation 312 includes assigning, to UE 102, the cell with the uplink frequency band having the minimum relative PL for UE 102. In some examples, assigning, to UE 102, the cell with the uplink frequency band having the minimum relative PL for UE 102 comprises assigning, by network 110, to UE 102, the cell with the uplink frequency band having the minimum relative PL for the UE. In examples of flowchart 300 that use the PL threshold determination of decision operation 308, operation 312 includes assigning, to UE 102, the cell with the uplink frequency band having the minimum relative PL for UE 102, based on at least the PL for the cell having the minimum relative PL for UE 102 not meeting the PL threshold, assigning, to UE 102, the cell with the uplink frequency band having the minimum relative PL for UE 102.

Figure 4A:
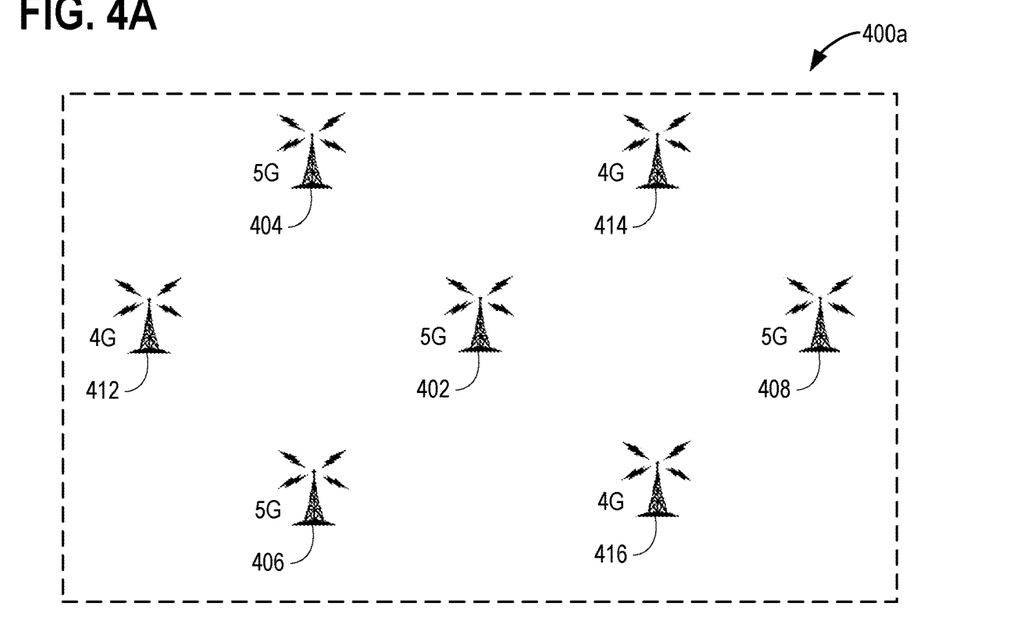
FIGS. 4A and 4B illustrate two example test layouts used in an exemplary simulation.
Figure 4B:
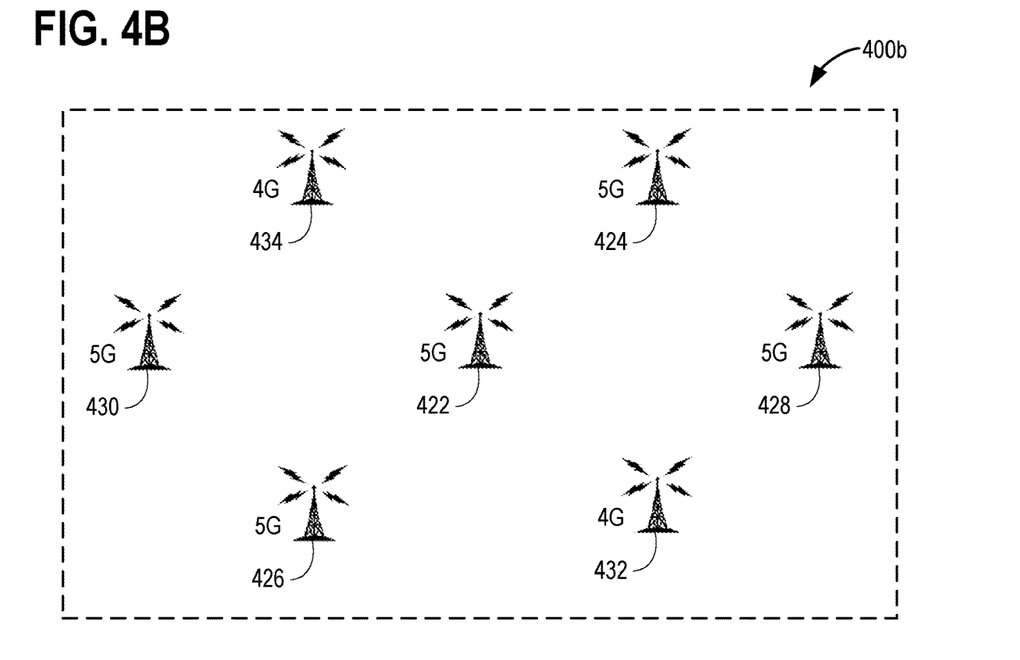

FIG. 4A illustrates a test layout 400a, in which there are four 5G cells, cell 402, cell 404, cell 406, and cell 408, and three 4G cells, cell 412, cell 414, and cell 416. FIG. 4B illustrates a test layout 400b, in which there are five 5G cells, cell 422, cell 424, cell 426, cell 428, and cell 430, and two 4G cells, cell 432 and cell 434. Test layouts are used in a simulation to predict the effectiveness of interference aware cell selection, with results shown in FIGS. 5A and 5B. The cells illustrated in FIGS. 4A and 4B are spaced apart by hundreds of meters, for example, by approximately 600 meters between the base stations of cells 412 and 408 and approximately 500 meters between the base stations of cells 404 and 406. FIGS. 4A and 4B are shown at approximately the same scale. The 5G cells operate at approximately 3.5 GHz, and the 4G cells operate at approximately 600 MHz. The modeled network uses a 7-cell hexagonal layout pattern with a single omnidirectional antenna each, an urban line-of-sight model, and a UE transmit power of 23 dBm (decibels relative to one milliwatt). The base stations noise figure is 5 dB with full PL compensation using $P_0$ of −90 dBm and a PL threshold of −115 dBm. A total of 140 UEs are simulated in random locations, with equal RB allocation.

Figure 5A:
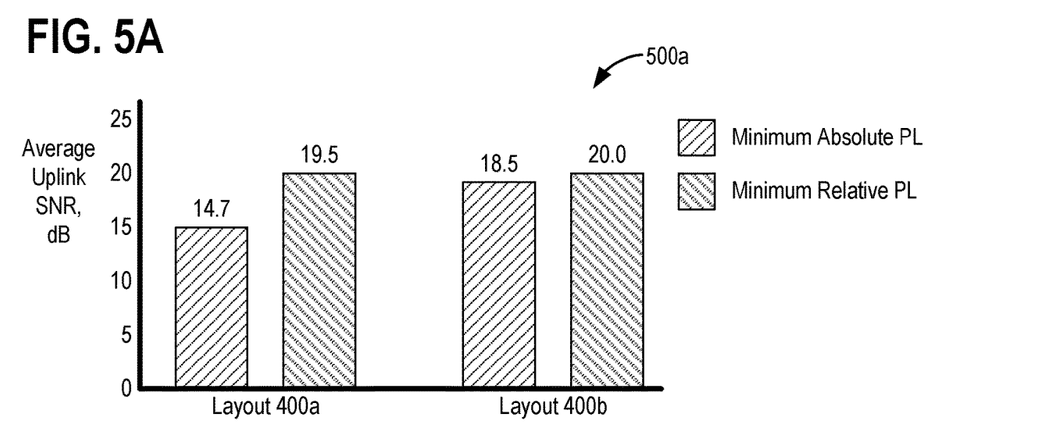
FIGS. 5A and 5B show performance gains for interference aware uplink cell selection in the test layouts of FIGS. 4A and 4B.

FIG. 5A is a plot 500a comparing the average uplink SNR when selecting cells according to the minimum absolute PL versus selecting cells according to the minimum relative PL, for both test layouts 400a and 400b. For test layout 400a, the average uplink SNR improves from 14.7 dB, when selecting cells according to the minimum absolute PL, to 19.5 dB, when selecting cells according to the minimum relative PL. This is an improvement of 4.8 dB. The simulation results indicate that average uplink cell interference is −104.5 dBm for 4G and −111.0 dBm for 5G when selecting cells according to the minimum absolute PL. The average uplink cell interference is −101.6 dBm for 4G and −114.1 dBm for 5G when selecting cells according to the minimum relative PL.

For test layout 400b, the average uplink SNR improves from 18.5 dB, when selecting cells according to the minimum absolute PL, to 20.0 dB, when selecting cells according to the minimum relative PL. This is an improvement of 1.5 dB. The simulation results indicate that average uplink cell interference is −112.1 dBm for 4G and −116.3 dBm for 5G when selecting cells according to the minimum absolute PL. The average uplink cell interference is −111.3 dBm for 4G and −116.3 dBm for 5G (unchanged) when selecting cells according to the minimum relative PL.

Figure 5B:
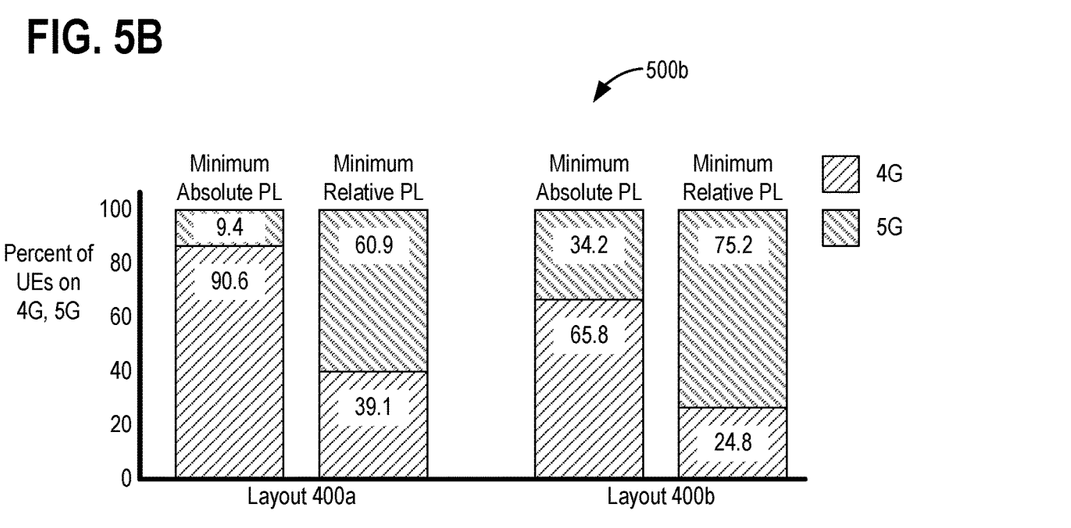

FIG. 5B is a plot 500b comparing the percentage of UEs on 4G cells versus on 5G cells when selecting cells according to the minimum absolute PL versus selecting cells according to the minimum relative PL, for both test layouts 400a and 400b. Selecting cells according to the minimum absolute PL may favor 4G cells, since the generally lower frequencies tend to have superior propagation in some scenarios. However, in some scenarios, higher use of 4G may also worsen interference. Thus moving UEs to 5G may generally improve (lessen) interference in some scenarios.

For test layout 400a, only 9.4% of the UEs are assigned to a 5G cell, and 90.6% of the UEs are assigned to a 4G cell, when selecting cells according to the minimum absolute PL. However, 60.9% of the UEs are assigned to a 5G cell, and 39.1% of the UEs are assigned to a 4G cell, when selecting cells according to the minimum relative PL. For test layout 400b, 34.2% of the UEs are assigned to a 5G cell, and 65.8% of the UEs are assigned to a 4G cell, when selecting cells according to the minimum absolute PL. However, 75.2% of the UEs are assigned to a 5G cell, and 24.8% of the UEs are assigned to a 4G cell, when selecting cells according to the minimum relative PL.

This improvement in load balancing results in an increase in the number of RBs scheduled for each UE in a subframe, thereby increasing throughput of cellular network data traffic. For example, the average number of RBs scheduled for a UE increased from 2.2 to 2.5 with test layout 400a and from 3.3 to 3.9 for test layout 400a, when changing from selecting cells according to the minimum absolute PL to selecting cells according to the minimum relative PL.

Figure 6:
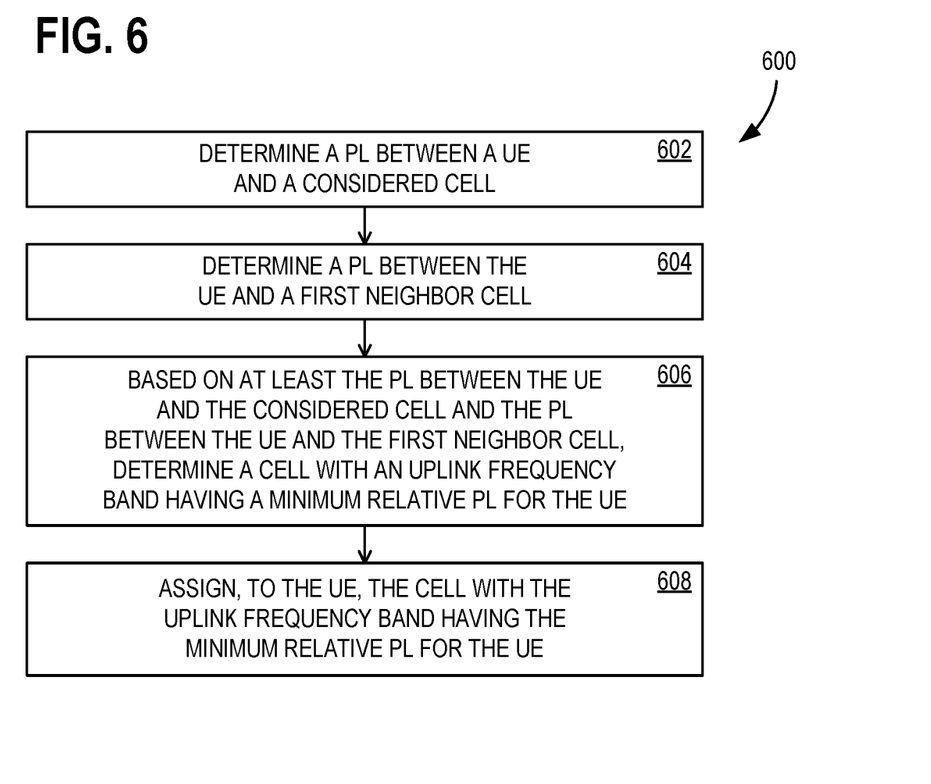
FIG. 6 illustrates another flowchart of exemplary operations associated with the arrangement of FIG. 1.

FIG. 6 illustrates a flowchart 600 of exemplary operations associated with interference aware uplink cell selection for a UE on a network. In some examples, at least a portion of flowchart 600 may be performed using one or more computing devices 700 of FIG. 7. Operation 602 includes determining a PL between the UE and a considered cell. Operation 604 includes determining a PL between the UE and a first neighbor cell. Operation 606 includes, based on at least the PL between the UE and the considered cell and the PL between the UE and the first neighbor cell, determining a cell with an uplink frequency band having a minimum relative PL for the UE. Operation 608 includes assigning, to the UE, the cell with the uplink frequency band having the minimum relative PL for the UE.

Figure 7:
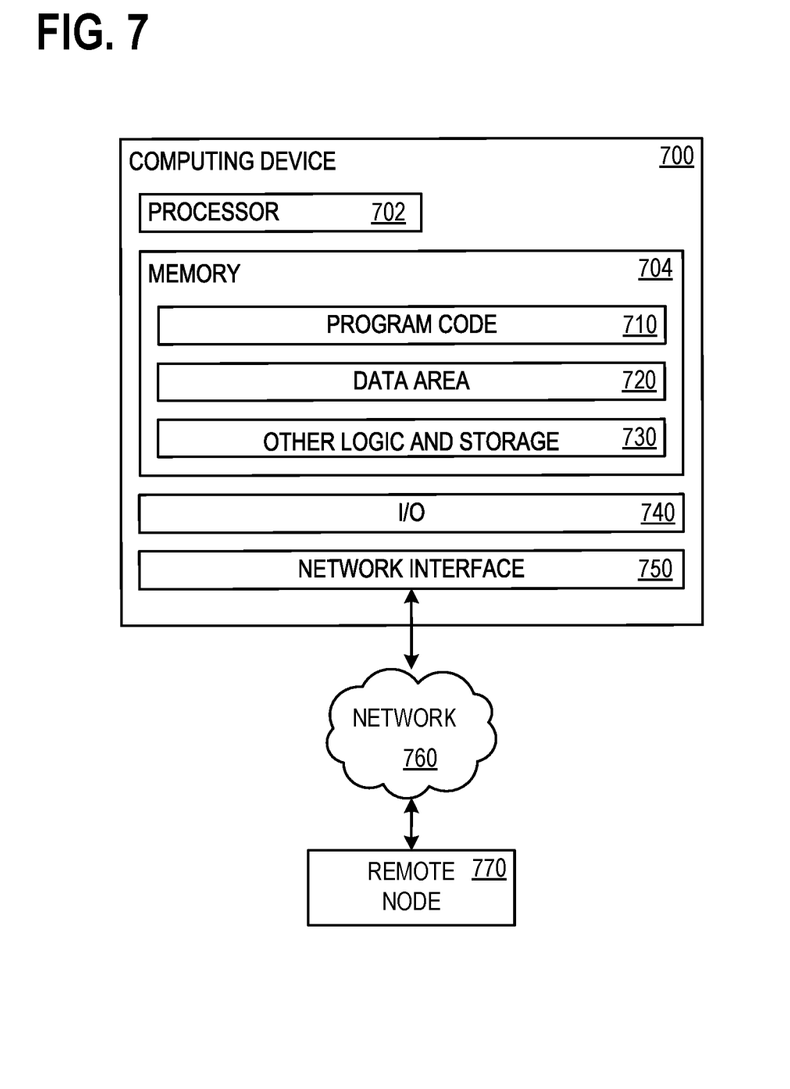
FIG. 7 illustrates a block diagram of a computing device suitable for implementing various aspects of the disclosure.

FIG. 7 illustrates a block diagram of computing device 700 that may be used as a component of arrangement 100a of FIG. 1A and/or arrangement 100b of FIG. 1B, for example, as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including any instructions necessary to perform operations described herein. Data area 720 holds any data necessary to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over a network 760 with a remote node 770, which may represent another implementation of computing device 700.

Additional Examples

An exemplary system for interference aware uplink cell selection for a UE on a network having multiple frequency bands comprises: a processor; and a computer-readable medium storing instructions that are operative upon execution by the processor to: determine a PL between the UE and a considered cell; determine a PL between the UE and a first neighbor cell; based on at least the PL between the UE and the considered cell and the PL between the UE and the first neighbor cell, determine a cell with an uplink frequency band having a minimum relative PL for the UE; and assign, to the UE, the cell with the uplink frequency band having the minimum relative PL for the UE.

An exemplary method of interference aware uplink cell selection for a UE on a network having multiple frequency bands comprises: determining a PL between the UE and a considered cell; determining a PL between the UE and a first neighbor cell; based on at least the PL between the UE and the considered cell and the PL between the UE and the first neighbor cell, determining a cell with an uplink frequency band having a minimum relative PL for the UE; and assigning, to the UE, the cell with the uplink frequency band having the minimum relative PL for the UE.

One or more exemplary computer storage devices has computer-executable instructions stored thereon, which, upon execution by a computer, cause the computer to perform operations comprising: determining a PL between a UE and a considered cell on a network having multiple frequency bands; determining a PL between the UE and a first neighbor cell; based on at least the PL between the UE and the considered cell and the PL between the UE and the first neighbor cell, determining a cell with an uplink frequency band having a minimum relative PL for the UE; and assigning, to the UE, the cell with the uplink frequency band having the minimum relative PL for the UE.

Alternatively, or in addition to the other examples described herein, examples include any combination of the following:

determining whether the PL for the cell having the minimum relative PL for the UE meets a PL threshold;

assigning, to the UE, the cell with the uplink frequency band having the minimum relative PL for the UE comprises, based on at least the PL for the cell having the minimum relative PL for the UE not meeting the PL threshold, assigning, to the UE, the cell with the uplink frequency band having the minimum relative PL for the UE;

based on at least the PL for the cell having the minimum relative PL for the UE meeting the PL threshold, assigning, to the UE, the cell with the uplink frequency band having the minimum absolute PL for the UE;

determining an average PL between the UE and each of a plurality of neighbor cells, the plurality of neighbor cells comprising the first neighbor cell;
determining the cell with the uplink frequency band having the minimum relative PL for the UE comprises, based on at least the PL between the UE and the considered cell and the PLs between the UE and each of the plurality of neighbor cells, determining the cell with the uplink frequency band having the minimum relative PL for the UE;
determining the PL between the UE and the first neighbor cell comprises determining, by the network, the PL between the UE and the first neighbor cell;
determining the PL between the UE and the first neighbor cell comprises receiving, by the network, from the first neighbor cell, an indication of the PL between the UE and the first neighbor cell;
determining the PL between the UE and the first neighbor cell comprises receiving, by the network, from the UE, an indication of the PL between the UE and the first neighbor cell;
the network comprises both 5G and 4G cellular network cells;
the network comprises overlapping 5G cellular network cells with multiple frequency bands;
determining the cell with the uplink frequency band having the minimum relative PL for the UE comprises determining, by the network, the cell with the uplink frequency band having the minimum relative PL for the UE; and
assigning, to the UE, the cell with the uplink frequency band having the minimum relative PL for the UE comprises assigning, by the network, to the UE, the cell with the uplink frequency band having the minimum relative PL for the UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of interference aware uplink cell selection for a user equipment (UE) on a network having multiple frequency bands, the method comprising:
determining a path loss (PL) between the UE and each of a plurality of cells, the plurality of cells comprising a considered cell and a plurality of neighbor cells;
determining an average PL of the plurality of neighbor cells based on the PLs between the UE and each of the plurality of neighbor cells;
based on at least the PL between the UE and the considered cell, the PLs between the UE and each of the plurality of neighbor cells, and the average PL of the plurality of neighbor cells, determining a cell with an uplink frequency band having a minimum relative PL for the UE, wherein determining the cell with the uplink frequency band having the minimum relative PL for the UE comprises:
determining a relative PL of the considered cell by subtracting the average PL from the PL between the UE and the considered cell;
determining the relative PL of the considered cell is lowest among relative PLs of each of the plurality of cells; and
based at least on the considered cell having the lowest relative PL, determining the considered cell is the cell with the uplink frequency band having the minimum relative PL; and
assigning, to the UE, the cell with the uplink frequency band having the minimum relative PL for the UE.

2. The method of claim 1, further comprising:
determining whether the PL for the cell having the minimum relative PL for the UE meets a PL threshold; wherein
assigning, to the UE, the cell with the uplink frequency band having the minimum relative PL for the UE comprises, based on at least the PL for the cell having the minimum relative PL for the UE not meeting the PL threshold, assigning, to the UE, the cell with the uplink frequency band having the minimum relative PL for the UE; and
based on at least the PL for the cell having the minimum relative PL for the UE meeting the PL threshold, assigning, to the UE, the cell with the uplink frequency band having the minimum absolute PL for the UE, wherein the cell with the uplink frequency band having the minimum absolute PL for the UE is the cell that provides the highest signal strength among the plurality of cells.

3. The method of claim 1, wherein the considered cell and the plurality of neighbor cells use an overlapping frequency band.

4. The method of claim 1, wherein determining the PL between the UE and each of the plurality of cells comprises determining, by the network, the PL between the UE and each of the plurality cells.

5. The method of claim 1, wherein determining the PL between the UE and each of the plurality of cells comprises receiving, by the network, from each of the plurality of cells, an indication of the PL between the UE and each of the plurality of cells.

6. The method of claim 1, wherein the network comprises both fifth generation (5G) and fourth generation (4G) cellular network cells.

7. The method of claim 1, wherein the network comprises overlapping fifth generation (5G) cellular network cells with multiple frequency bands.

8. A system for interference aware uplink cell selection for a user equipment (UE) on a network having multiple frequency bands, the system comprising:
a processor; and a computer-readable medium storing instructions that are operative upon execution by the processor to:
 determine a path loss (PL) between the UE and each of a plurality of cells, the plurality of cells comprising a considered cell and a plurality of neighbor cells;
 determine an average PL of the plurality of neighbor cells based on the PLs between the UE and each of the plurality of neighbor cells;
 based on at least the PL between the UE and the considered cell, the PLs between the UE and each of the plurality of neighbor cells, and the average PL of the plurality of neighbor cells, determine a cell with an uplink frequency band having a minimum relative PL for the UE, wherein determining the cell with the uplink frequency band having the minimum relative PL for the UE comprises:
  determining a relative PL of the considered cell by subtracting the average PL from the PL between the UE and the considered cell;
  determining the relative PL of the considered cell is lowest among relative PLs of each of the plurality of cells; and
  based at least on the considered cell having the lowest relative PL, determining the considered cell is the cell with the uplink frequency band having the minimum relative PL; and
 assign, to the UE, the cell with the uplink frequency band having the minimum relative PL for the UE.

9. The system of claim 8, wherein the operations are further operative to:
 determine whether the PL for the cell having the minimum relative PL for the UE meets a PL threshold; wherein
  assigning, to the UE, the cell with the uplink frequency band having the minimum relative PL for the UE comprises, based on at least the PL for the cell having the minimum relative PL for the UE not meeting the PL threshold, assigning, to the UE, the cell with the uplink frequency band having the minimum relative PL for the UE; and
  based on at least the PL for the cell having the minimum relative PL for the UE meeting the PL threshold, assigning, to the UE, the cell with the uplink frequency band having the minimum absolute PL for the UE, wherein the cell with the uplink frequency band having the minimum absolute PL for the UE is the cell that provides the highest signal strength among the plurality of cells.

10. The system of claim 8, wherein the considered cell and the plurality of neighbor cells use an overlapping frequency band.

11. The system of claim 8, wherein determining the PL between the UE and each of the plurality of cells comprises determining, by the network, the PL between the UE and the each of the plurality of cells.

12. The system of claim 8, wherein determining the PL between the UE and each of the plurality of cells comprises receiving, by the network, from each of the plurality of cells, an indication of the PL between the UE and each of the plurality of cells.

13. The system of claim 8, wherein the network comprises both fifth generation (5G) and fourth generation (4G) cellular network cells.

14. The system of claim 8, wherein the network comprises overlapping fifth generation (5G) cellular network cells with multiple frequency bands.

15. One or more non-transitory computer storage devices having computer-executable instructions stored thereon, which, upon execution by a computer, cause the computer to perform operations comprising:
 determining a path loss (PL) between a user equipment (UE) and each of a plurality of cells, the plurality of cells comprising a considered cell and a plurality of neighboring cells, on a network having multiple frequency bands;
 determine an average PL of the plurality of neighbor cells based on the PLs between the UE and each of the plurality of neighbor cells;
 based on at least the PL between the UE and the considered cell, and the PLs between the UE and each of the plurality of neighbor cells, and the average PL of the plurality of neighbor cells, determining a cell with an uplink frequency band having a minimum relative PL for the UE, wherein determining the cell with the uplink frequency band having the minimum relative PL for the UE comprises:
  determining a relative PL of the considered cell by subtracting the average PL from the PL between the UE and the considered cell;
  determining the relative PL of the considered cell is lowest among relative PLs of each of the plurality of cells; and
  based at least on the considered cell having the lowest relative PL, determining the considered cell is the cell with the uplink frequency band having the minimum relative PL; and
 assigning, to the UE, the cell with the uplink frequency band having the minimum relative PL for the UE.

16. The one or more non-transitory computer storage devices of claim 15, wherein the operations further comprise:
 determining whether the PL for the cell having the minimum relative PL for the UE meets a PL threshold; wherein
  assigning, to the UE, the cell with the uplink frequency band having the minimum relative PL for the UE comprises, based on at least the PL for the cell having the minimum relative PL for the UE not meeting the PL threshold, assigning, to the UE, the cell with the uplink frequency band having the minimum relative PL for the UE; and
  based on at least the PL for the cell having the minimum relative PL for the UE meeting the PL threshold, assigning, to the UE, the cell with the uplink frequency band having the minimum absolute PL for the UE, wherein the cell with the uplink frequency band having the minimum absolute PL for the UE is the cell that provides the highest signal strength among the plurality of cells.

17. The one or more non-transitory computer storage devices of claim 15, wherein the considered cell and the plurality of neighbor cells use an overlapping frequency band.

18. The one or more non-transitory computer storage devices of claim 15, wherein determining the PL between the UE and each of the plurality of cells comprises determining, by the network, the PL between the UE and each of the plurality of cells.

19. The one or more non-transitory computer storage devices of claim 15, wherein determining the PL between the UE and each of the plurality of cells comprises receiving, by the network, from each of the plurality of cells, an indication of the PL between the UE and each of the plurality of cells.

20. The one or more non-transitory computer storage devices of claim 15, wherein the network comprises fifth generation (5G) cellular network cells with multiple frequency bands.

\* \* \* \* \*